United States Patent
Terrell

[15] 3,655,153
[45] Apr. 11, 1972

[54] PNEUMATIC SYSTEM CARRIER CONSTRUCTION

[72] Inventor: William H. Terrell, Akron, Ohio
[73] Assignee: Diebold, Incorporated, Canton, Ohio
[22] Filed: July 10, 1970
[21] Appl. No.: 53,786

[52] U.S. Cl. .................................243/35, 243/39, 220/60
[51] Int. Cl. .................................................B65g 51/06
[58] Field of Search ............243/32, 35; 220/39, 60; 215/1, 215/41, 1 R; 229/8; 215/1 R

[56] References Cited

UNITED STATES PATENTS

| | | | |
|---|---|---|---|
| 3,419,181 | 12/1968 | Stec | 220/60 |
| 3,514,614 | 5/1970 | Freeman | 243/32 |
| 3,484,015 | 12/1969 | Rowan | 220/60 |
| 2,786,474 | 3/1957 | Miller | 215/1 |

FOREIGN PATENTS OR APPLICATIONS

| 261,249 | 4/1949 | Sweden | 243/32 |
|---|---|---|---|

Primary Examiner—Harvey C. Hornsby
Attorney—Frease & Bishop

[57] ABSTRACT

An open end carrier construction for conveying folded paper or paper-like slips between terminal stations in pneumatic tube systems. A hollow carrier body is formed with open ends, one end of which is closed by a disc and cap. The carrier body is double-concave and forms a narrow inner passage or slot intermediate the carrier ends through which folded slips extend and in which the slips are securely gripped when inserted in the carrier body through the uncapped end.

5 Claims, 11 Drawing Figures

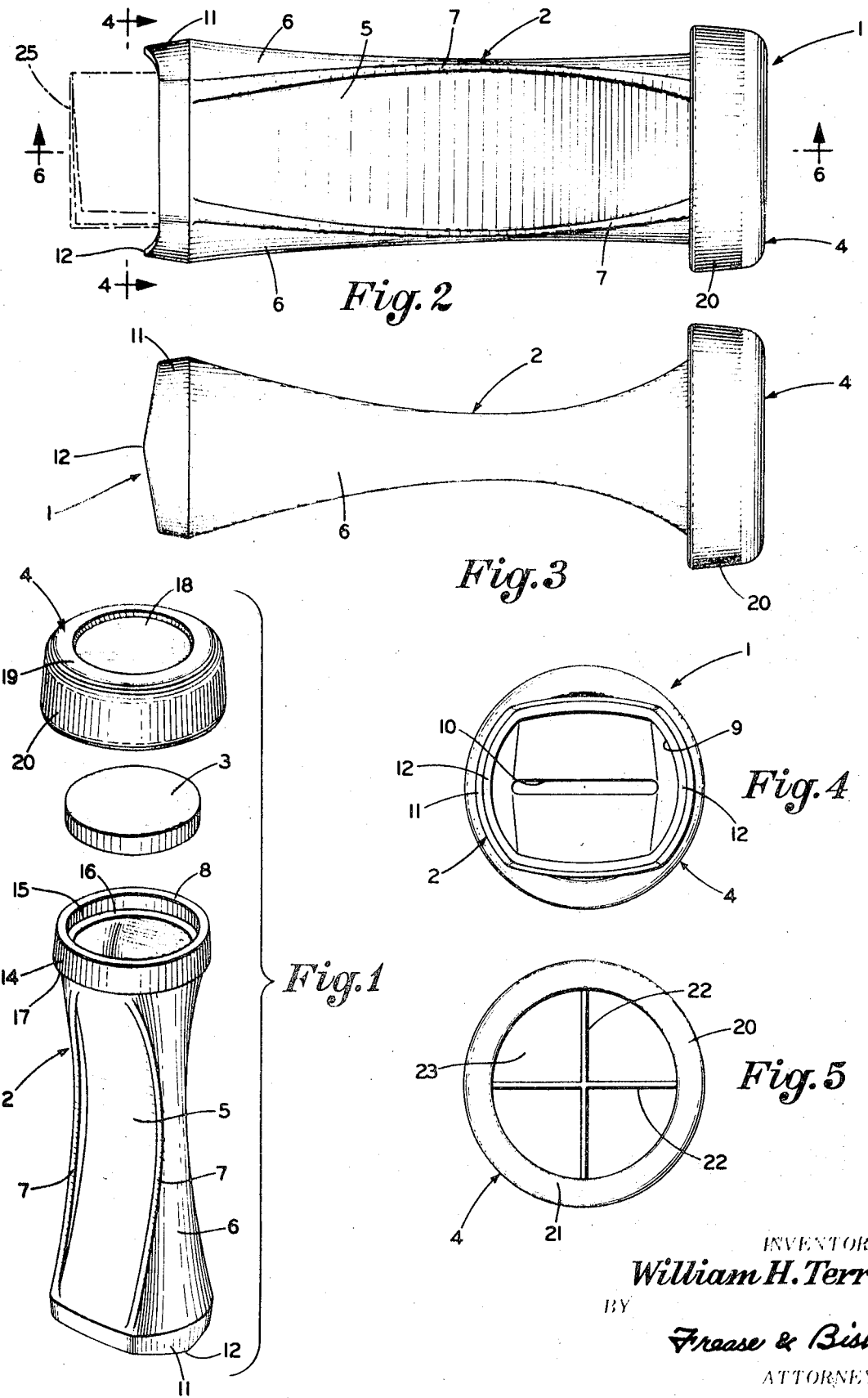

Patented April 11, 1972

INVENTOR.
William H. Terrell
BY
Frease & Bishop
ATTORNEY 3,655,153

PNEUMATIC SYSTEM CARRIER CONSTRUCTION

BACKGROUND OF THE INVENTION

1. Field of the Invention

The invention relates to pneumatic tube system carriers; and particularly to carriers having an open end and which move to and from terminal stations, such as a broker's desk and a central collection station in a pneumatic tube system at a brokerage office. More particularly the invention relates to noncaptive carriers having bodies shaped securely to hold folded order slips or paper articles and the like inserted into and which may extend outward of open ends of such carriers as the carriers travel through pneumatic tubes.

2. Description of the Prior Art

Many types of closed and open end carriers have been used for conveying small paper items such as sales slips, order blanks and the like in pneumatic tube systems. Carriers having one end open for inserting and removing paper articles are desirable since they eliminate the time and inconvenience of opening and closing such carriers, and the open ends permit paper slips longer than the carriers to project from the open ends of the carriers during movement through pneumatic tubes.

Known open end carriers usually include various means for retaining the paper within the carrier such as spring clips, internal ribs, and molding the carrier body of rubber or like material to frictionally hold rolled paper articles in the carrier. Carriers having restricted or inwardly tapered ends have been used. Such retaining means usually require additional components which are expensive and subject to breakage; and some structures require the use of expensive materials to form the carrier body. Reduced initial and replacement costs are very important where large numbers of such carriers are used in particular types of business, such as at brokerage houses.

The required carrier weight may vary depending upon the particular pneumatic system in which the carrier is used. Carriers in many pneumatic systems may operate to open valves and gates along their routes of travel. The specific carrier weight and its speed of travel determine the ability of the carrier to pen the valves encountered during travel.

Known open end carriers have no provision for changing the carrier weight without changing the carrier body construction, which, in turn, requires the manufacture and stocking of carriers having a range of different weights. Likewise, such carriers must be able to withstand the shock or impact of sudden stopping at a terminal in a pneumatic tube system.

Thus, a need has existed for an open end carrier construction for conveying paper articles in a pneumatic tube system which holds the paper article without requiring additional carrier components, which enables the carrier weight to be varied easily when desired, and which is of a simple, rugged and inexpensive construction.

SUMMARY OF THE INVENTION

Objectives of the invention include providing an improved open end carrier construction for pneumatic tube systems for transporting paper slips; providing an open end carrier construction in which the carrier body itself firmly holds the paper articles inserted without additional carrier components; providing an open end carrier construction having a body easily formed of semi-rigid plastic material; providing an open end carrier construction in which one end is closed by an end closure which functions as an accelerator disc and an end bumper pad; providing an open end carrier construction having means for readily changing the carrier weight to accommodate different pneumatic tube system requirements; providing an open end carrier construction in which the components are easily replaced if they become damaged or worn; and providing an open end carrier construction of simple and rugged construction which eliminates maintenance and repair problems, which achieves the stated objects in a simple, effective and inexpensive manner, and which solves problems and satisfies needs existing in the art.

These and other objectives and advantages may be obtained by the open end carrier construction, the general nature of which may be stated as including a hollow carrier body terminating in a generally rectangular open front end and a circular open rear end; the carrier body having curved or tapered, concave top and bottom walls, hourglass-shaped side walls, and preferably flange-like ribs at the corners where the top and bottom walls merge with the side walls; an annular collar having a rear edge formed integrally with the carrier body surrounding the open rear end, a recessed shoulder formed inside said collar; a disc, preferably complementary in shape and size to the collar, telescoped within the collar; and seated on said shoulder; a cap having an end wall terminating in an annular flange formed at its open end with a reentrant flange; said cap annular flange being telescoped over said collar and the reentrant being snapped over and engaged with the collar rear edge to retain the disc within the collar and close the open rear end of the body; and said top, bottom, and side walls forming a narrow passage within the carrier body intermediate the ends of the body; whereby folded paper articles inserted into the hollow body are held by the concave top and bottom walls in said narrow passage.

BRIEF DESCRIPTION OF THE DRAWINGS

A preferred embodiment of the invention—illustrative of the best mode in which applicant has contemplated applying the principles—is set forth in the following description and shown in the drawings, and is particularly and distinctly pointed out and set forth in the appended claims.

FIG. 1 is an exploded perspective view of the parts of the improved carrier construction;

FIG. 2 is a top plan view of the carrier construction containing a folded slip of paper shown in dot-dash lines;

FIG. 3 is a side elevational view of the carrier construction shown in FIG. 2;

FIG. 4 is an end elevational view of the carrier construction looking in the direction of the arrows 4—4, FIG. 2;

FIG. 5 is an end elevational view of the interior of the carrier cap;

Similar numerals refer to similar parts throughout the drawings.

DESCRIPTION OF THE PREFERRED EMBODIMENT

An improved carrier is generally indicated at 1 (FIGS. 2 and 3) and includes as components a carrier body 2, a disc 3, and a cap 4.

Figure 6:
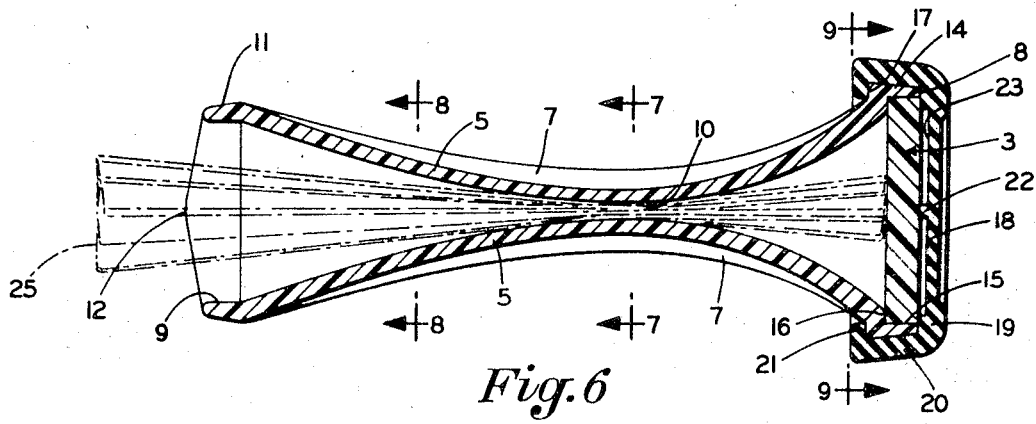
FIG. 6 is a sectional view taken on line 6—6, FIG. 2.
Figure 8:
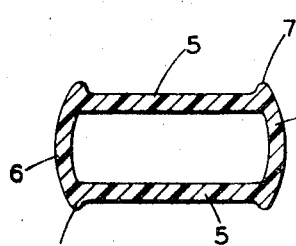
FIG. 8 is a sectional view taken on line 8—8, FIG. 6.
Figure 7:
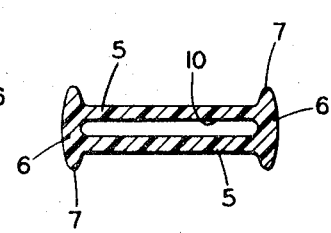
FIG. 7 is a sectional view taken on line 7—7, FIG. 6.

Body 2 is hollow, preferably molded of semi-rigid plastic material and formed by generally tapered concave top and bottom walls 5, and hourglass-shaped side walls 6, which have flange-like ribs 7 at the corners where the top, bottom and side walls join together. A circular open rear end 8 and a somewhat rectangular open front end 9 are formed at the ends of body 2. A relatively narrow passage portion 10 (FIG. 7) is formed generally centrally oblong intermediate the open ends 8 and 9 by parallel and closely adjacent concave portions of top and bottom walls 5, and body 2 has an increasingly larger oblong cross-sectional shape toward either end beyond the central oblong passage portion 10 (FIGS. 6 and 8). A slightly inwardly tapered edge 11 having tips 12 surrounds open end 9 to provide quiet movement through the pneumatic tube system.

An annular collar 14 having an inner surface 15 is formed integrally with body 2 and surrounds open end 8 forming an annular recessed shoulder 16 within collar 14. Collar 14 has a rear edge 17 which projects outward from body 2.

Disc 3 is complementary in shape and size to the interior of collar 14 and preferably has an effective thickness approximately equal to the depth of shoulder 16. Disc 3 may be formed of steel, lead, plastic, or like material and may vary in weight to function properly in a specific pneumatic system.

Cap 4 preferably is molded of flexible urethane plastic and preferably has a slightly depressed circular front wall 18 (FIG. 1) where a company name, trademark, or other identifying symbol may be molded. The wall 18 may be thickened at 19 to facilitate standing the carrier 1 upright on cap 4 on a desk or other flat surface ready for loading and also to provide good impact distribution when carrier 1 strikes a pneumatic tube valve or stop plate.

End wall 18 of cap 4 terminates in an annular flange 20 (FIG. 6) which in turn is formed at its open end with a reentrant flange 21 complementary to edge 17 of collar 14 over which flange 21 is slip-fitted to secure cap 4 on carrier body 2. Ribs 22 (FIG. 5) may be formed on inside surface 23 of wall 18 to reinforce wall 18 and to distribute the impact force of disc 3 upon stopping at any pneumatic tube terminal.

The assembly of the improved carrier 1 is extremely simple requiring only the insertion of a weight disc 3 of proper weight into open carrier end 8 and slip-fitting flange 21 of cap 4 over rear edge 17 of collar 14.

Figure 11:
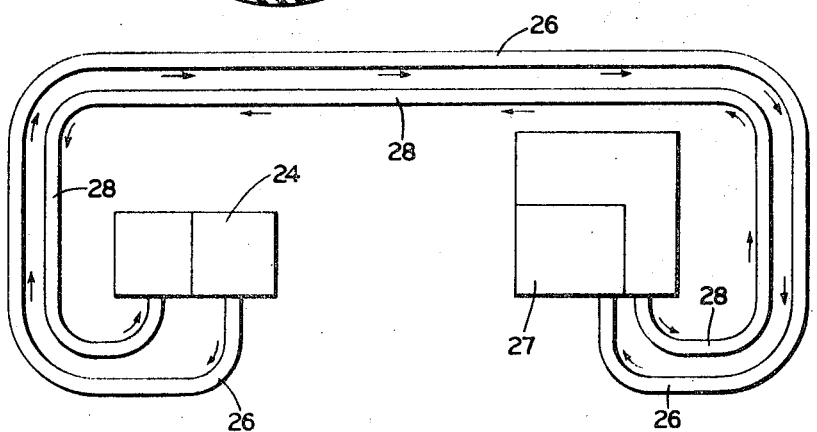
FIG. 11 is a diagrammatic view of a pneumatic tube system in which the carrier construction of FIGS. 1 to 10 may be used.

Carrier 1, in facilitating brokerage house operation, may be used in a two tube pneumatic system, illustrated in FIG. 11. Each broker will have appropriate terminal equipment 24 located on or near his desk, and as a buy or sell order is received, the order slip 25 (FIGS. 2 and 6) is folded and inserted into open end 9 of a carrier body 2. Slip 25 is folded a sufficient number of times depending upon the paper's thickness so that it is gripped by a tight fit between top and bottom walls 5 in passage 10.

Carrier 1 is then placed in a pneumatic send tube 26 which conveys it to terminal 27 at a central collection station where the slip 25 is then processed. Carrier 1 may be returned to the broker empty or with a confirmation slip in return tube 28.

Figure 10:
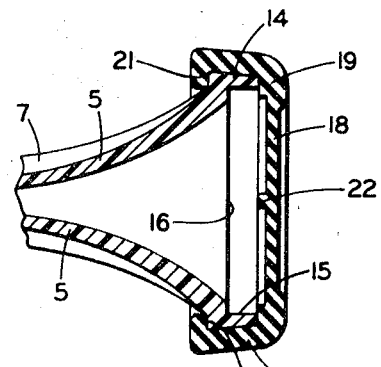
FIG. 10 is a fragmentary sectional view of an alternate carrier construction without a weight disc.
Figure 9:
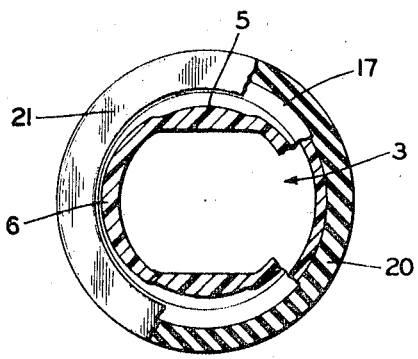
FIG. 9 is a sectional view taken on line 9—9, FIG. 6.

Carrier 1 need not have a weight disc 3 located in open end 8 (FIG. 10) to function properly in any pneumatic systems where the weight of carrier body 2 is sufficient to open the necessary pneumatic valves and gates. Flange 21 of cap 4 engages rear edge 17 of collar 14 in the same manner as when disc 3 is present with thickened end ring 19 seated against collar 14 securing cap 4 tightly on body 2.

The improved carrier construction 1 has a number of advantageous features. The narrow central passage 10 grips an inserted folded paper and eliminates extra parts for retaining the paper in body 2. Such extra parts when used are subject to breakage and damage. Noise as carrier 1 travels through the pneumatic tube is minimized because body 2 is formed of semi-rigid plastic material. Likewise, some flexing of body 2 is desirable at the narrow section 10 of the carrier where the paper slip 25 is held to accommodate various thicknesses of folded paper.

The generally rectangular shape of front body end 9 enables carrier 1 to be laid on its side without rolling off a desk or table. Likewise, the continuous open front end 9 permits an extra long paper message (FIG. 2) to protrude beyond the end of carrier body 2 for a short distance and still pass through the pneumatic tube system without separation from the carrier.

Cap 4 molded of urethane plastic with its flanges 20 and 21 provides good wear characteristics for the carrier assembly. Likewise, cap 4 may be molded in various colors so that a different color is a code for the particular station to which the carrier is to be conveyed, or for the carrier contents. Cap 4 is frictionally held in position on body 2 and does not require any separate fasteners which may be damaged or become inoperative. Prior carriers usually have an accelerator disc in addition to the closure for the end of a carrier, which the improved construction eliminates, the cap 4 serving the double function.

The required carrier weight needed for proper pneumatic tube operation is obtained easily without altering body 2 or cap 4 by making the disc 3 out of any of various materials. Disc 3 acts as a rigid support body 2 and cap 4, keeping them from crushing as a result of repeated sudden stops. Likewise, disc 3 keeps cap ribs 22 from moving into the carrier during acceleration and travel, and also acts as a stop for slip 25 when inserted from open end 9.

Simplicity, convenience, and efficiency is obtained by the ease of assembling the carrier components, the manner in which the messages are placed in and removed from the carrier, and the maintenance free construction of the components having no moving parts or mechanical connecting means.

Economies are achieved by simplicity of the component, the manner in which and material from which they are produced, and the easy assembly and replaceability of individual components should they become worn or broken.

In the foregoing description, certain terms have ben used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the pneumatic system carrier construction is constructed and used, the characteristics of the new construction, and the advantageous, new and useful results obtained; the new and useful structures, devices, elements, arrangements, parts, and combinations are set forth in the appended claims.

I claim:

1. Pneumatic tube system carrier construction including a hollow carrier body terminating in front and rear ends, one end of which is open; the carrier body having top and bottom concave walls and hourglass-shaped side walls forming a narrow, laterally elongated, generally central, oblong passage portion intermediate the carrier ends; and said carrier body having an increasingly larger oblong cross-sectional shape toward either end beyond said oblong passage portion; wherein a folded slip of material inserted into the body through the open end is retained within the body and is gripped at said narrow central oblong passage portion by the top and bottom concave walls.

2. Pneumatic tube system carrier construction including a hollow carrier body terminating in open front and rear ends and having concave top and bottom carrier walls and hourglass-shaped side walls forming a narrow, laterally elongated, generally central, oblong passage portion within the carrier body between said top and bottom walls and intermediate the ends; the carrier body having an increasingly larger oblong cross-sectional shape toward either end beyond said narrow oblong passage portion; and removable closure means for the open rear end; whereby a folded slip of material inserted into the body through the front open end is retained within the body and gripped by the top and bottom walls at said narrow passage portion.

3. The carrier construction defined in claim 2 in which the open front end is generally rectangular in shape and the open rear end is circular in shape.

4. The carrier construction defined in claim 2 in which an annular collar surrounds the carrier open rear end and is formed integrally with the carrier body; and in which the collar has a rear edge which projects outward from the carrier body; whereby the end closure may engage the collar rear edge to secure said closure means to the carrier body.

5. The carrier construction defined in claim 4 in which a shoulder is formed within the collar; in which a disc complementary in shape and size to the collar and shoulder is telescoped within said collar and seated upon the shoulder; and in which the end closure means retains the disc within the collar.

* * * * *